United States Patent [19]

Muntzer et al.

[11] 3,804,661
[45] Apr. 16, 1974

[54] MATERIALS HAVING HYDROPHOBIC AND OLEOPHILIC CHARACTERISTICS AND METHOD FOR PREPARING

[75] Inventors: Emile Muntzer; Paul Muntzer, both of Strasbourg, France

[73] Assignee: WIBAU, Westdeutsche Industrie-und Strassenbau-Maschinen-Gesellschaft m.b.H., Rothenbergen, Germany

[22] Filed: Feb. 14, 1972

[21] Appl. No.: 226,333

[30] Foreign Application Priority Data
Feb. 24, 1971 France .............................. 71.07030

[52] U.S. Cl..................... 117/62.2, 117/69, 117/72, 117/87, 117/88, 117/91, 117/92, 117/100 B, 117/100 S, 117/100 A, 210/36, 210/40, 210/DIG. 21
[51] Int. Cl......................... B01d 15/00, B44d 1/14
[58] Field of Search......... 117/100 B, 100 S, 100 A, 117/69, 72, 87, 88, 91, 92, 62.2; 210/36, DIG. 21; 252/467

[56] References Cited
UNITED STATES PATENTS

| | | | |
|---|---|---|---|
| 3,265,615 | 8/1966 | Buss | 252/467 X |
| 3,193,398 | 7/1965 | Iannicelli | 117/100 S |
| 2,273,040 | 2/1942 | Iler | 117/100 S |
| 3,519,593 | 7/1970 | Bolger | 117/100 B X |
| 3,382,170 | 5/1968 | Pape | 117/100 S X |
| 3,010,840 | 11/1961 | Goff et al. | 117/100 S X |
| 3,562,153 | 2/1971 | Tully et al. | 117/100 B X |

FOREIGN PATENTS OR APPLICATIONS

| | | | |
|---|---|---|---|
| 1,516,830 | 2/1968 | France | 117/100 B |

*Primary Examiner*—Ralph Husack
*Attorney, Agent, or Firm*—W. G. Fasse

[57] ABSTRACT

Powderized, comminuted or granular materials are made hydrophobic or water repellent and simultaneously oleophilic or oil attracting by first mixing the materials with a chromium salt solution and then adding to the mixture a bridging agent such as a thermoplastic hydrocarbon which envelopes the material particles. These materials are especially suitable for the clean-up of oil spills.

13 Claims, No Drawings

MATERIALS HAVING HYDROPHOBIC AND OLEOPHILIC CHARACTERISTICS AND METHOD FOR PREPARING

BACKGROUND OF THE INVENTION

The invention relates to materials having hydrophobic and oleophilic characteristics. These materials are powderized, granulated, or comminuted inorganic and/or organic dispersed solid materials which have been activated to become oleophilic and hydrophobic. The activating process provides for the application of a three valent chromium salt to the individual material particles. The chromium salt may comprise additives. After drying, the materials are contacted with liquid or liquefied oils or thermoplastics having a polar or non-polar molecular structure.

Many technologies are based on the further use or treatment of dispersed solid materials which are enveloped by a binder agent and which in their processed state form a structure which is more or less coherent. The mechanical strength of these structures depends on several factors, for example on the granular characteristics of the solid materials and their individual mechanical strength as well as on the readiness of the mixture to densify and on the characteristics of the binder agent especially on its adhesiveness relative to the solid materials. Such adhesiveness may be increased by adhesive improving components. The mechanical strength of the structure also depends on the adhesiveness of bridging agents which initially envelop the solid materials.

French Pat. No. 1,516,830 discloses an exceptionally effective adhesiveness between bituminous and thermoplastic materials and mineral surfaces which have been treated with three valent chromium salts whereby the treatment involves a dry-on process. On the basis of this prior art further research has been made in an effort to make such adhesiveness improving means or rather the disperse solid materials which have been treated with such means, available for use in a wide range of technical areas also outside the construction field.

OBJECTS OF THE INVENTION

In view of the foregoing, it is the aim of the invention to achieve the following objects singly or in combination:

to provide a dispersed material which by its characteristics may be used for many purposes, for example, in road construction as well as for cleaning up oil spills or slicks;

to provide a method for producing a material which has hydrophobic and oleophilic characteristics; and to select the carrier materials, such as powderized, granulated, or comminuted inorganic or organic materials, and the enveloping materials in such a manner as to assure a satisfactory adhesiveness to the materials to be bound, in other words, to develop optimum enveloping characteristics of dispersed solid materials for the intended purposes.

SUMMARY OF THE INVENTION

The research leading up to the present invention resulted in two groups of activated dispersed solid materials. The first group of materials according to the invention, in contrast to the second group, is treated solely with pure chromic salts. The second group of materials according to this invention is additionally treated, preferably during the drying process, with polar or nonpolar organic materials.

The characteristic behavior of the disperse solid materials falling into the first group is seen in that these materials are water repellent or hydrophobic to a limited degree and that they enter into a bond with hydrocarbon compounds of random molecular structure only in the dry state. In the moist state, that is, in the presence of water they enter into such a bond only with nonpolar hydrocarbon compounds whereby said bond is durable and of good adhesion. Thus, in connection with this first group, it is to be noted that only polar hydrocarbon compounds are capable of adhesively enveloping chrome activated disperse solid materials under water.

Contrary to the foregoing, the disperse solid materials falling into the second group are characterized in that they enter into durable and adhesive bonds with polar and nonpolar hydrocarbon compounds in the dry state, as well as in the presence of water provided that during the drying process polar or non-polar organic substances have been added to the chromites whereby a highly water repellent or hydrophobic product is obtained. The term "chromite" is translated from the German term "Chromite" which is the generic term for chromium compounds derived from trivalent chromium.

It is to be noted that the solid materials which have been treated exclusively with chromites adhere only to polar substances whereas the solid materials which in addition to the chromite treatment have been treated with polar or nonpolar organic substances and which have been dried, adhere also to nonpolar substances in the presence of water whereby such adherence is strong and durable.

According to the invention there is provided a method for preparing disperse, solid materials having hydrophobic and oleophilic characteristics comprising mixing said solid materials into a watery solution of a three valent chromium salt or salts for enveloping the particles of said disperse, solid materials with a chromium salt coating, drying the materials, and continuing the mixing of the material particles while adding a bridging agent whereby the particles are provided with means capable of acting as a link to hydrocarbon substances.

According to the invention there is further provided a disperse, solid material having hydrophobic and oleophilic characteristics comprising a powderized, granular or comminuted base material including particles coated with a three valent chromium salt envelope and further including a bridging agent of a material having a polar or nonpolar molecular structure capable of binding hydrocarbon substances.

DETAILED DESCRIPTION OF THE INVENTION

The interesting characteristics of the materials according to the invention may be demonstrated quite clearly by removing activated, hydrophobic mineral granules which have been stored in water, from the water. Thus, it will be seen that the remaining water adhering to the particles will immediately draw together and separate itself from the mineral granules. A drop of oil applied to the water surface enhances this just described separation by its substantial spreading on the surface of the granules since the oil film resulting from the spreading effect tends to seek direct contact with the chromium salt coating whereby possibly still adhering water drops or remaining water droplets are pushed off.

The hydrophobic and simultaneously oleophilic characteristics of the solid materials are surprising because it has been ascertained that the solid materials in the presence of water, that is, even in the water itself remain enveloped by the hydrocarbon compounds in an adhesive manner. The tendency to be enveloped is so strong that the solid components may be enveloped even under water at room temperatures by liquid hydrocarbon compounds such as blended bitumen. This experiment cannot be repeated with solid components which have not been pretreated. To the contrary, sand which is enveloped by blended bitumen sheds such envelope already after a short time of storage in water.

The foregoing statements apply especially to disperse minerals of the silicon type, for example quartz sands. Such mineral cannot be enveloped in practice in a water tight manner.

It has further been found that the envelopes of the disperse activated solid materials of the first group act as bridging means, and thus as intermediate envelopes, for a further enveloping by hydrocarbon compounds provided that the solid components are mineral materials and are enveloped under water by small amounts of organic materials which act as said intermediate envelopes. The materials forming the intermediate envelopes must be of an animal or vegetable basis and have a polar molecular structure. These intermediate envelopes are hydrophobic and, as mentioned, act simultaneously as bridging agents for the further enveloping by hydrocarbon compounds such as oils, thermoplastic materials or the like having a nonpolar molecular structure.

The organic materials which have a polar molecular structure and form said intermediate envelopes are required in small amounts. Generally a polar oil present in an amount of about 0.2 percent by weight of the weight of the mineral is sufficient to act as a bridging agent for 10 percent by weight of a bituminous binder component or another nonpolar material such as paraffin or the like, said 10 percent by weight also referring to the weight of the mineral. The following substances have been found suitable as a polar oil such as oils of an animal or vegetable origin, for example, talon oil, liquid resin or tall oil, rape oil, or olive oil and so forth.

These oils may be employed during the activating process according to the teachings disclosed for the second group of materials mentioned above in the same manner as the polar materials for obtaining the hydrophobic characteristics.

It is interesting that water softeners added to the water do not impair the adhesive strength between the activated disperse solid materials and enveloping films of oils or thermoplastic substances regardless whether the latter have a polar or a nonpolar molecular structure. This is a surprising result since it is in direct contradiction to the expected effect of such water softeners which according to all normal considerations are intended to at least facilitate the removal of such enveloping films.

It has also been found to be an important advantage of the invention that these disperse solid materials, provided they are mineral substances having a water coating of a pH-value smaller than 7, have an even increased enveloping tendency in the presence of oils or thermoplastic materials in water. This finding is important because it permits quite frequently to select the proper mineral components best suitable for the particular purpose.

The disadvantages of adding too small a dosage of bridging oils or of the thermoplastic materials which build up on or envelop the oils, may be overcome by an acidification step. An alternating acidification and neutralization or alkalization results in an alternating enveloping and shedding in the presence of water. It has further been found that it is possible to provide the disperse solid materials with enveloping characteristics in the presence of water by adding wetting agents to the mixture where too small a dosage of the polar oils which act as the bridging agent or too small a dosage of the nonpolar thermoplastic materials which build up upon said bridging oils by enveloping them have been added to the mixture in the first place.

A further possibilty of activating the disperse solid materials by means of chromium salts and by means of bridging agents provides that during the preparation process of the solid materials chromic salts are added to said solid materials. These chromic salts are obtained in that during their production reducing vegetable substances are added in a manner known as such to the liquid phase or state of said chromic salts, said reducing vegetable substances comprising hydrophobic components having a polar molecular structure. An example of such a substance or rather of such an activated, disperse solid material is saw dust comprising in addition to the fibers which absorb oxygen and which facilitate the transformation of the six valent chromium salt ($CrO_3$) into a three valent salt ($Cr_2O_3$), resins and lipid components, that is, substances having a polar molecular structure and bridge forming, water repellent or hydrophobic properties. The resins or lipid components remain in the final product and become effective when the product is used for the intended purpose.

There are, however, instances in which a repeated heating step may be avoided, especially in the interest of a rationalization of the preparation process for instance when using thermoplastic materials in connection with the briquetting of mineral components. This is possible in that the disperse moist mineral substances, to which chromites have been added in a watery solution, are dried in the presence of a thermoplastic hydrocarbon compound or in the presence of a substance comprising a proportion of such a compound whereby the drying components are intermixed with each other and simultaneously loosened up. In this manner the thermoplastic substance diffuses into the disperse solid material mixture whereby the solid component particles become hydrophobic and simultaneously oleophilic.

The disperse solid materials according to the invention may be used advantageously and efficiently for cleaning up of large and small oil spills, for example, the results of a tanker accident. For this use the carrier materials are preferably of floating type such as expanded mineral materials for example perlite, vermiculite or the like. In such a use according to the invention, the disperse solid materials are spread on top of the oil spill, for example, by hand or through a blower apparatus. The material is left floating in contact with the oil spill and acts as an auxiliary means for binding the oil floating on the water. After the material has taken up or bound the oil, it is removed for example by skimming or by suction means well known. After removal of the material from the water surface it may be disposed in any ecologically satisfactory manner, it may also be cleaned to be used again. The cleaning may be accomplished by burning the oil. After the burning the material may be used again.

It will be appreciated that the above shown affinity between minerals which have been activated with chromites and certain classes of organic substances may be employed for separating from the water other substances present in the water.

The above disclosure shows that an activation of a disperse solid material by a three valent chromium salt which activation is free of organic contaminations, is not sufficient for achieving, in the presence of water, an adhesive enveloping of these activated materials by hydrocarbon compounds having a nonpolar molecular structure. Rather, a bridging agent is required which may comprise:

a. thermoplastic substances or oils of a polar molecular structure such as talon oil, tall oil, or other oils of a vegetable or animal origin; or
b. water softening wetting agents, such as $C_{12}$-dodecyl-2-sulfate, which are then precipitated by alkaline earth chloride; or
c. thermoplastic substances or oils of a nonpolar molecular structure which are dried together with the chromites in solution on the carrier or base material.

EXAMPLES OF THE INVENTION

Example 1

1,000 kg of a quartz type or silicon type river sand are used as the carrier or base material. 0.200 to 1.200 kg, or 0.02 to 0.12 percent by weight, of chromic sulfate are solved in 40 kg, or 4.00 percent by weight, of water and mixed with the base material. To this is added 0.400 to 0.600 kg, or 0.04 to 0.06 percent by weight, of oil or thermoplastic substances of a polar or nonpolar molecular structure.

The oils or thermoplastic substances which may be used in the above Example 1 may be, for instance, liquid resins, colophony, tall oil, other, preferably rancid, fatty materials or thermoplastic substances having a softening point of about 100°C.

When the sand and the additives are dried together by heating, while the mixture is simultaneously continuously agitated, a hydrophobic activated sand is obtained which envelops itself easily even under water with hydrocarbon compounds including paraffins. The actual bridging agent can have a polar or nonpolar molecular structure.

It is even possible to produce the bridging agent exclusively under water where the mineral substances have been separately pretreated with chromites. However, in this instance it is required for the formation of the bridging agent to supply a flowable substance of a polar molecular structure in a quantity within the above stated range while meeting the other conditions.

Example 2

1.000 kg sand which is of a neutral or basic character is employed as a base or carrier material. To the sand there is added 0.200 to 1.200 kg, or 0.02 to 0.12 percent by weight, of chromic sulfate and 40 kg or 4.00 percent by weight of water in solution. After solution of the chromic sulfate, 0.050 kg or 0.005 percent by weight of blended bitumen is added to the mixture.

Here again the final product may be obtained in different ways. For example, the chromic solution may be separately dried onto the solid carrier or base material and heated. In the alternative the chromite solution may be applied together with the means for forming a bridging agent whereupon the mixture is heated.

From an experiment to produce a bridge formation it will be noted that the quantity of additives given as an example is too small for the bridge formation under certain circumstances, for instance where a cold mixing is employed a bridge formation takes place only after adding hydrochloric acid or sulfuric acid to the water surrounding the disperse solid materials. After the neutralization or alkalization of the sand which has been made insufficiently hydrophobic, it becomes hydrophobic while simultaneously shedding its envelope.

The process of an acidification which alternates with a neutralization or with an alkalization may be repeated as often as desired and makes it possible to separate substances from the water as has been explained above.

Example 3

The carrier or base material is the same as in Example 2. However, instead of the oils or of the thermoplastic substances, a wetting agent is now employed in the form of 0.400 to 0.700 kg, or 0.04 to 0.07 percent by weight of Teepol or $C_{12}$-dodecyl-2-sulfate. In this instance, even if cold mixing is employed, a good enveloping is achieved, whereby the envelope is rather durable provided that the wetting agent is precipitated by alkaline earth salts subsequent to the enveloping.

Example 4

100 kg of saw dust are used as a carrier or base material. 0.250 to 1.00 kg, or 0.25 to 1.00 percent by weight, of chromic sulfate are admixed to the saw dust together with water present in an amount sufficient to assure a homogeneous intermixing of the components. Thereafter, the mixture is dried.

After the drying the so treated saw dust is completely hydrophobic. The resins present in the wood are effective as bridging agents for the hydrocarbon compounds. Contrary thereto, there is no affinity between hydrocarbon compounds and ordinary saw dust which has not been treated by chromic sulfate in the presence of water. Practically the same results have been achieved in tests employing rice shells, comminuted straw and similar materials.

The resulting products may, for example, be used for binding oil floating on water whereby they act as a wick so that the oil may be burned up and the material used again. A mixture merely comprising water, saw dust, and oil does not burn.

It should be noted in this context that it is generally simpler to activate organic substances and to make them water repellent as compared to inorganic substances.

Example 5

1,000 kg of perlite which is an expanded mineral substance having a volume of 12 cubic meters per ton is used as the carrier or base material. 0.200 to 1.200 kg, or 0.02 to 0.120 percent by weight of chromic sulfate are admixed to the base material together with 20 to 100 kg, or 20 to 100 percent by weight, of water. Further, 0.4 to 4.00 kg, or 0.04 to 0.4 percent by weight, of superstabilized bitumen emulsions in water are added to the mixture.

The addition of the emulsion in the above stated range is desirable in order to achieve a good adhesion or bond of the very fine perlite dusts. A suitable emulsion in this respect is the product disclosed in French Pat. No. 1,516,830.

The mass is homogenized and then dried. The product has been found hydrophobic and is so oleophilic that it can bind in an adhesive manner the oil floating on the water to an extent or quantity corresponding to 5 times and more the weight of the mixture.

Activated perlite can be used as often as desired, whereby it is removed from the water as by skimming, burned-up and thereafter applied again to the water surface as an oil binding means. It is even possible to perform the burn-up step while the mixture is floating on the water because the water repellent perlite forms a wick only for the oil and does not provide a passage for the water into the combustion zone.

Independently of the foregoing examples, it is possible to envelop perlite, as any other mineral, with bitumen in accordance with the present disclosure whereby it is irrelevant to what extent the bitumen penetrates into the perlite.

Although the invention has been described with reference to specific examples, it is to be understood that it is intended to cover all modifications and equivalents within the scope of the appended claims.

What is claimed is:

1. A method for preparing disperse, solid materials having hydrophobic and oleophilic characteristics comprising mixing said solid materials into a watery solution consisting of an inorganic three valent chromium salt for enveloping the particles of said disperse, solid materials with a chromium salt coating, drying the materials, and continuing the mixing of the chromium salt coated material particles while adding a bridging agent of a polar or non-polar organic material to provide an affinity to hydrocarbon substances, said polar organic material consisting of an oil of an animal or vegetable origin, said non-polar organic material consisting of a thermoplastic material of a bituminous, paraffin or resin origin.

2. The method according to claim 1, comprising mixing said disperse solid materials with a solution including 0.02 to 1 percent of three valent chromic sulfate by weight of said disperse, solid materials and about 4 to 100 percent of water also by weight of said disperse, solid materials, drying said disperse, solid materials, adding said bridging agent to the drying materials, while continuing the mixing and drying to loosen-up the mixture, the amount of added bridging agent ranging from 0.005 to 0.4 percent by weight of said disperse solid materials.

3. The method according to claim 1, wherein said disperse, solid materials are moist mineral materials with a water content or water envelope having a pH-value of less than 7.

4. The method according to claim 1, wherein said disperse, solid materials inherently comprise a sufficient quantity of said bridging agent.

5. The method according to claim 1, further comprising adding as said bridging agent a superstabilized bituminous watery emulsion in an amount of 0.04 to 0.4 percent by weight of said disperse, solid material.

6. The method according to claim 1, wherein said disperse, solid material is an expanded mineral.

7. The method according to claim 1, further comprising adding a softening agent to the water.

8. A method for preparing disperse, solid materials having hydrophobic and oleophilic characteristics, comprising mixing said solid materials into a watery solution consisting of an inorganic three valent chromium salt for enveloping the particles of said disperse solid materials with a chromium salt coating, and admixing a bridging agent to said watery solution of the three valent chromium salt, said bridging agent being a polar or non-polar organic material to provide an affinity to hydrocarbon substances, said polar organic material consisting of an oil of an animal or vegetable origin, said non-polar organic material consisting of a thermoplastic material of a bituminous or paraffin or resin origin and then drying said disperse, solid materials.

9. A method for preparing disperse, solid materials having hydrophobic and oleophilic characteristics, comprising mixing said solid materials into a watery solution consisting of an inorganic three valent chromium salt for enveloping the particles of said disperse solid materials with a chromium salt coating, and admixing a bridging agent to said watery solution of the three valent chromium salt, said bridging agent being a water softening wetting agent, and precipitating said wetting agent by means of alkaline earth chloride.

10. A disperse, solid material having hydrophobic and oleophilic characteristics comprising a powderized, granular or comminuted base material coated with an inorganic three valent chromium salt envelope, and also coated with a bridging agent of an organic material having a polar or non-polar molecular structure, said polar organic material consisting of an oil of an animal or vegetable origin, said non-polar organic material consisting of a thermoplastic material of a bituminous, paraffin or resin origin.

11. The material according to claim 10, wherein said disperse, solid material is saw dust coated by said inorganic three valent chromium salt, said saw dust including inherently a sufficient quantity of resins acting as said bridging agent for binding hydrocarbon substances.

12. The materials according to claim 10, wherein said disperse, solid material is an expanded mineral.

13. A disperse, solid material having hydrophobic and oleophilic characteristics comprising a powderized, granular or comminuted base material coated with an inorganic three valent chromium salt envelope, said inorganic three valent chromium salt being present in about 0.02 percent by weight to about 1.0 percent by weight of said base material; also coated with a bridging agent of an organic material having a polar or non-polar molecular structure, said bridging agent being present in about 0.005 percent by weight to about 0.4 percent by weight of said base material, said polar organic material consisting of an oil of an animal or vegetable origin, said nonpolar organic material consisting of a thermoplastic material of a bituminous, paraffin or resin origin.

* * * * *